(12) United States Patent
Suzuki et al.

(10) Patent No.: US 8,928,770 B2
(45) Date of Patent: Jan. 6, 2015

(54) MULTI-SUBJECT IMAGING DEVICE AND IMAGING METHOD

(75) Inventors: Atsushi Suzuki, Daito (JP); Yuusuke Koura, Daito (JP)

(73) Assignee: KYOCERA Corporation, Kyoto (JP)

( * ) Notice: Subject to any disclaimer, the term of this patent is extended or adjusted under 35 U.S.C. 154(b) by 277 days.

(21) Appl. No.: 13/091,356

(22) Filed: Apr. 21, 2011

(65) Prior Publication Data
US 2011/0261219 A1 Oct. 27, 2011

(30) Foreign Application Priority Data
Apr. 26, 2010 (JP) .................. 2010-100639

(51) Int. Cl.
*H04N 5/225* (2006.01)
*H04N 5/232* (2006.01)

(52) U.S. Cl.
CPC ....... *H04N 5/23222* (2013.01); *H04N 5/23219* (2013.01)
USPC .......... 348/222.1; 382/118; 396/263

(58) Field of Classification Search
CPC .......... H04N 5/23219; G06K 9/00302; G06K 9/00308; G06K 9/00315
See application file for complete search history.

(56) References Cited

U.S. PATENT DOCUMENTS

| | | | |
|---|---|---|---|
| 2004/0223649 A1* | 11/2004 | Zacks et al. | 382/218 |
| 2005/0129324 A1* | 6/2005 | Lemke | 382/254 |
| 2005/0201594 A1* | 9/2005 | Mori et al. | 382/107 |
| 2006/0092292 A1* | 5/2006 | Matsuoka et al. | 348/231.99 |
| 2006/0256396 A1* | 11/2006 | Ejima et al. | 358/448 |
| 2008/0037841 A1* | 2/2008 | Ogawa | 382/118 |
| 2008/0285791 A1 | 11/2008 | Suzuki et al. | |
| 2008/0292299 A1* | 11/2008 | Kretz et al. | 396/263 |
| 2008/0317455 A1* | 12/2008 | Abe | 396/263 |
| 2009/0002516 A1* | 1/2009 | Suzuki et al. | 348/223.1 |
| 2009/0059021 A1* | 3/2009 | Rimon et al. | 348/222.1 |
| 2010/0020224 A1 | 1/2010 | Hattori et al. | |
| 2010/0033590 A1* | 2/2010 | Kawaguchi | 348/222.1 |
| 2010/0073506 A1* | 3/2010 | Uehara et al. | 348/222.1 |
| 2011/0013038 A1* | 1/2011 | Kim et al. | 348/222.1 |

FOREIGN PATENT DOCUMENTS

| | | |
|---|---|---|
| JP | 2003-141512 A | 5/2003 |
| JP | 2006-163496 A | 6/2006 |
| JP | 2008-205838 A | 9/2008 |
| JP | 2010-028773 A | 2/2010 |
| JP | 2010-531074 A | 9/2010 |
| WO | 2008-142478 A1 | 11/2008 |

OTHER PUBLICATIONS

Office Action dated Jul. 20, 2012, issued in counterpart Korean Application No. 10-2011-0038554.
Office Action dated Oct. 7, 2014 issued in counterpart Japanese application No. 2010-100639.

* cited by examiner

*Primary Examiner* — Twyler Haskins
*Assistant Examiner* — Dwight C Tejano
(74) *Attorney, Agent, or Firm* — Procopio, Cory, Hargreaves & Savitch LLP

(57) ABSTRACT

It is an object of the present invention to provide an imaging device and terminal device that recommend a preferred image to a user. A terminal device having a photography function captures a plurality of images, identifies a plurality of subjects in each of the captured images, acquires a photographic degree of suitability for each of the identified subjects, calculates an evaluation value for each captured image based on the number of subjects in the captured image having a photographic degree of suitability of at least a predetermined threshold, and displays the captured images, displaying one of the captured images so as to be distinguishable from other captured images based on the evaluation value.

9 Claims, 6 Drawing Sheets

Before photography

During recommended photography

MULTI-SUBJECT IMAGING DEVICE AND IMAGING METHOD

This application is based on an application No. 2010-100639 filed in Japan, the contents of which are hereby incorporated by reference.

TECHNICAL FIELD

The present invention relates to technology for recommending to a user one preferred image from among a plurality of captured images.

BACKGROUND ART

The functions of a camera provided in terminal devices have become diversified. For example, a function to capture a plurality of images in succession over a predetermined period of time (continuous photography function) may be provided.

Advances have been made in face recognition and smile recognition technology, and terminals provided with a camera function that includes such recognition technology have been developed.

Patent Literature 1 discloses technology for selecting one preferred image from among a plurality of continuously captured images in the context of a device having a camera function that combines a continuous photography function with recognition technology.

Patent Literature 1 discloses a digital camera (device) that first acquires, for each of a plurality of continuously captured images, a degree of smile of each face included in the image and calculates an average of the acquired degrees of smile. The image with the highest calculated average is selected as a preferred image.

This technology makes it possible to provide a user with a preferred image from among a plurality of continuously captured images.

CITATION LIST

Patent Literature

[Patent Literature 1]
Japanese Patent Application Publication No. 2010-28773

SUMMARY OF INVENTION

Technical Problem

In the above technology, a preferred image is selected based on an average of degrees of smile. For example, suppose four people have been photographed. When two of them are grinning broadly (degree of smile: 100), whereas the other two are not smiling (degree of smile: zero), the average degree of smile is 50. When in another image, all four people have a degree of smile of 40, the average is 40. In this case, the image with the average of 50 is selected as the preferred image.

Some users, however, may prefer images in which a larger number of people are smiling, such as for a commemorative photo of a trip. Therefore, the image selected according to the above technology may not always be the image the user prefers.

To resolve this problem, it is an object of the present invention to provide an imaging device, a terminal device, and an imaging method that recommend a preferred image to a user from among a plurality of images.

Solution to Problem

To achieve the above object, the present invention is an imaging device comprising: a photography unit configured to capture a plurality of images; an acquisition unit configured to identify a plurality of subjects in each of the captured images and to acquire a photographic degree of suitability for each identified subject; an evaluation unit configured to calculate an evaluation value for each captured image based on the number of subjects in the captured image having a photographic degree of suitability of at least a predetermined threshold; and a display unit configured to specify one of the captured images based on the evaluation value and display the specified one of the captured images so as to be distinguishable from the other captured images.

Advantageous Effects of Invention

With the above structure, the imaging device and terminal device recommend a preferred image to a user from among a plurality of images.

DESCRIPTION OF EMBODIMENTS

1. Embodiment 1

The following describes a mobile phone as an embodiment of a terminal device according to the present invention.

1.1 Outline

Figure 1A:
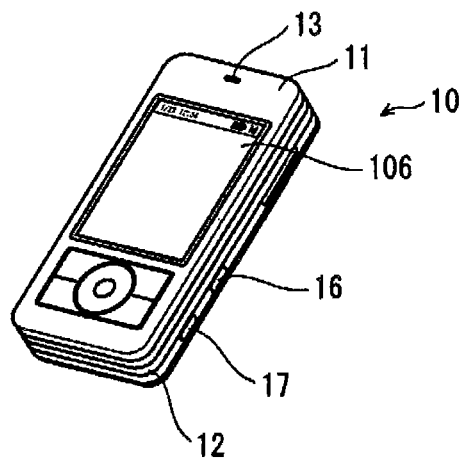
FIGS. 1A, 1B, and 1C show the outward appearance of a mobile phone 10.
Figure 1B:
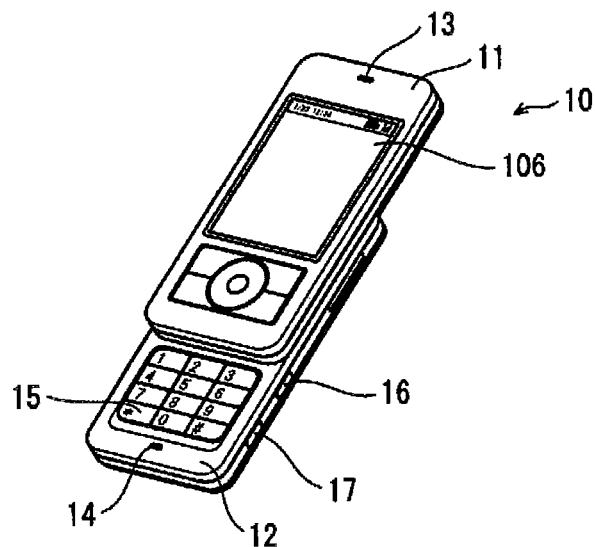
Figure 1C:
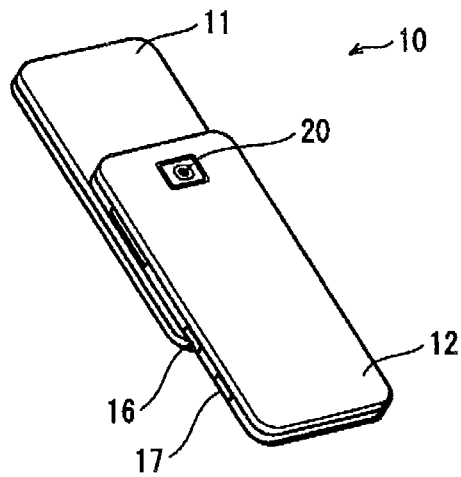

A terminal device is, for example, a mobile phone provided with a camera. The outward appearance of such a terminal device is described with reference to FIGS. 1A-1C. FIG. 1A is a perspective view of a mobile phone 10 in Embodiment 1 in a closed position, and FIG. 1B is a perspective view of the mobile phone 10 in an open position. FIG. 1C is a back view of the mobile phone 10 in the closed position.

The mobile phone 10 is provided with two housings, 11 and 12. The housing 11 is slid with respect to the housing 12 to open and close the mobile phone 10.

A display unit 106, which includes a liquid crystal display (hereinafter, LCD) or the like, and a speaker unit 13 are provided in the housing 11.

A microphone 14 and a key unit 15 are provided in the housing 12. Key units 16 and 17 are provided on a side of the housing 12, and a camera lens 20 is provided on the back of the housing 12.

When using the camera for photography, the mobile phone 10 displays subjects appearing in the camera lens 20 on the display unit 106, and images are captured by, for example, pressing the key unit 16.

Photography functions include regular photography, continuous photography, and recommended photography. Regular photography refers to capturing one image after one press of the key unit 16. Continuous photography refers to capturing a plurality of images at predetermined intervals after one press of the key unit 16. Note that the number of images is set in advance, for example to four or nine images. By pressing the key unit 16 once, continuous photography is performed for the set number of images. On the other hand, recommended photography refers to capturing a predetermined number of images (for example, four) at predetermined intervals after one press of the key unit 16 and recommending one of the predetermined number of images to the user (photographer).

The following describes technology related to recommended photography.

1.2 Structure

The following describes the structure related to the recommended photography function in the mobile phone 10.

Figure 2:
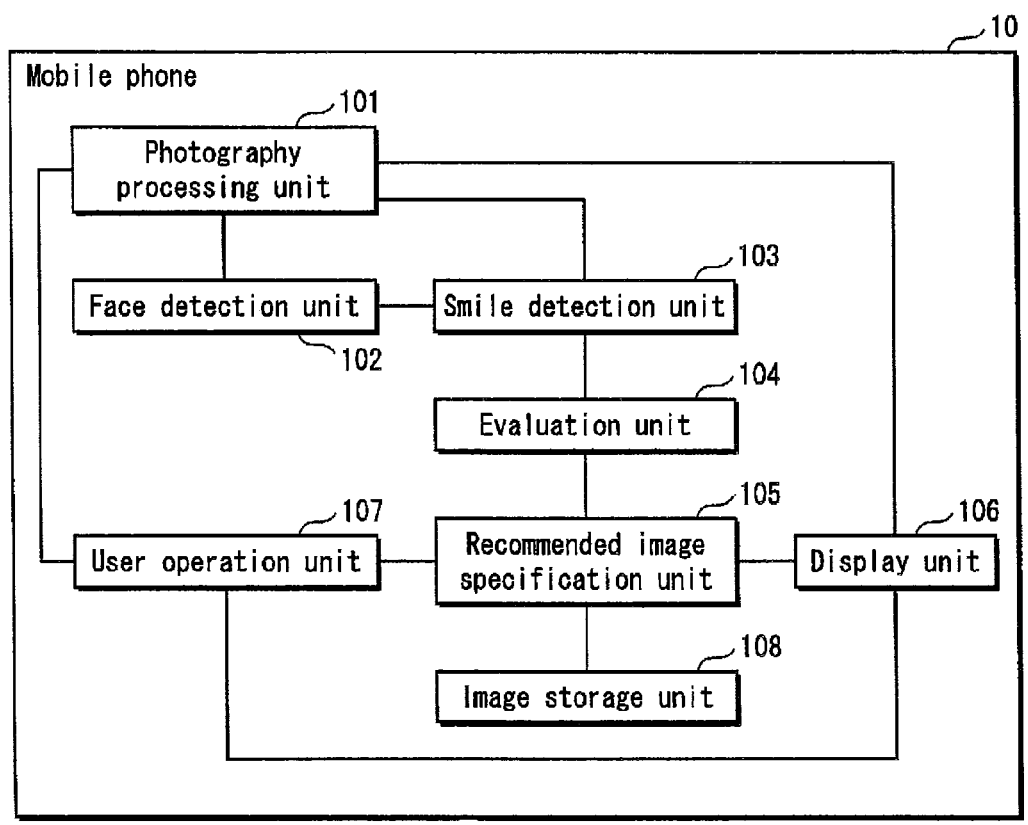
FIG. 2 is a block diagram showing constituent elements related to a recommended photography function in the mobile phone 10.

As shown in FIG. 2, the mobile phone 10 includes a photography processing unit 101, a face detection unit 102, a smile detection unit 103, an evaluation unit 104, a recommended image specification unit 105, a display unit 106, a user operation unit 107, and an image storage unit 108.

FIG. 2 only shows the constituent elements of the mobile phone 10 related to the recommended photography function. The mobile phone 10 is also provided with constituent elements for implementing the functions of a mobile phone, including constituent elements related to other photography functions, to communications functions, etc.

The photography processing unit 101, the face detection unit 102, the smile detection unit 103, the evaluation unit 104, the recommended image specification unit 105, the display unit 106, the user operation unit 107, and the image storage unit 108 of the mobile phone 10 shown in FIG. 2 are the constituent elements of the imaging device of the present invention. The photography processing unit 101 corresponds to the photography unit of the imaging device according to the present invention, and the smile detection unit corresponds to the acquisition unit of the imaging device according to the present invention.

(1) Photography Processing Unit 101

The photography processing unit 101 includes the camera lens 20 and performs processing related to photography. Specifically, the photography processing unit 101 is provided with mechanisms for focus, zoom, and diaphragm shutter control. Images are captured through the operations of these mechanisms.

During recommended photography, the photography processing unit 101 captures four continuous images at predetermined intervals.

(2) Face Detection Unit 102

The face detection unit 102 detects faces from among subjects captured by the camera lens 20. Specifically, the face detection unit 102 stores sample images of human faces in advance and detects faces by matching the sample images with the subjects captured by the camera lens 20.

Note that facial detection is well-known technology, and therefore a description thereof is omitted.

In the present Embodiment, the face detection unit 102 is capable of detecting up to four people's faces.

(3) Smile Detection Unit 103

The smile detection unit 103 detects a degree of smile in each face detected by the face detection unit 102. Specifically, the smile detection unit 103 stores sample images for characteristic locations of a smiling face (such as the mouth, the inner and outer corners of the eyes, etc.) in advance. Based on location information that indicates the location of the face detected in a subject captured by the camera lens 20 before pressing of the key unit 16, the smile detection unit 103 identifies the location of the photographed face. The smile detection unit 103 compares sample images of the characteristic locations of a smiling face with the corresponding locations in the identified face, thus acquiring a degree of matching (degree of smile). In this embodiment, the smile detection unit 103 acquires an integer from 0 to 100 as the degree of smile. For example, the higher the value of the degree of smile, the more the person in the photograph is smiling, with a degree of smile of 100 representing a broad grin.

During recommended photography, the smile detection unit 103 acquires the degree of smile of each face included in each of four captured images. When the face detection unit 102 does not detect any faces, the smile detection unit 103 does not acquire any degrees of smile.

(4) Evaluation Unit 104

The evaluation unit 104 calculates an evaluation value for each captured image based on the degree of smile acquired by the smile detection unit 103.

Specifically, the evaluation unit 104 acquires, for each of the four images captured during recommended photography, the number of faces included in the image that have a degree of smile of 45 or higher (i.e. the number of smiles). The evaluation unit 104 evaluates the image in terms of the acquired degrees of smile by calculating the ratio of the number of smiles to the number of faces detected by the face detection unit 102, thus yielding the evaluation value. When the face detection unit 102 does not detect any faces in an image, the evaluation unit 104 does not evaluate the image but simply sets the evaluation value to zero.

(5) Recommended Image Specification Unit 105

Based on the evaluation value of each image as calculated by the evaluation unit 104, the recommended image specification unit 105 specifies one recommended image among the four images captured during recommended photography.

When the user operation unit 107 receives a storage instruction for one of the images displayed on the display unit 106, the recommended image specification unit 105 writes the image to the image storage unit 108.

When specifying the recommended image, the recommended image specification unit 105 performs the following processing in accordance with the number of faces detected.

(5-1) when Two to Four Faces are Detected

First, the recommended image specification unit 105 determines whether an evaluation value of one exists among any of the calculated evaluation values. In other words, the recommended image specification unit 105 determines whether, in any of the images, all of the detected faces have a degree of smile of at least 45. Such an image is hereinafter referred to as a candidate image.

When a candidate image is determined to exist, the recommended image specification unit 105 furthermore determines whether a plurality of candidate images exist. When a plurality of candidate images is indeed determined to exist, the recommended image specification unit 105 specifies the candidate image with the highest total of the degrees of smile as the recommended image. On the other hand, when a plurality of candidate images does not exist, i.e. when only one candidate image exists, the recommended image specification unit 105 specifies this candidate image as the recommended image.

When no candidate image exists, i.e. when there is no image in which the degrees of smile of all of the detected faces are at least 45, the recommended image specification unit 105 specifies the image with the highest total of the degrees of smile as the recommended image.

(5-2) When One Face is Detected

In this case, the recommended image specification unit 105 specifies the image with the highest degree of smile as the recommended image.

(5-3) when No Face is Detected

In this case, the evaluation value is zero for all of the images. The recommended image specification unit 105 specifies the first image that was captured as the recommended image.

(6) Display Unit 106

The display unit 106 is provided with the function of displaying, before photography, subjects captured by the camera lens 20 and with the function of displaying a list of the four images captured during recommended photography. When displaying the list, the display unit 106 displays a thumbnail for each image. The thumbnail of the image specified by the recommended image specification unit 105 as the recommended image is displayed so as to be distinguishable from the thumbnails of the other images.

The following describes images displayed by the display unit 106 with reference to a specific example.

Figure 3A:
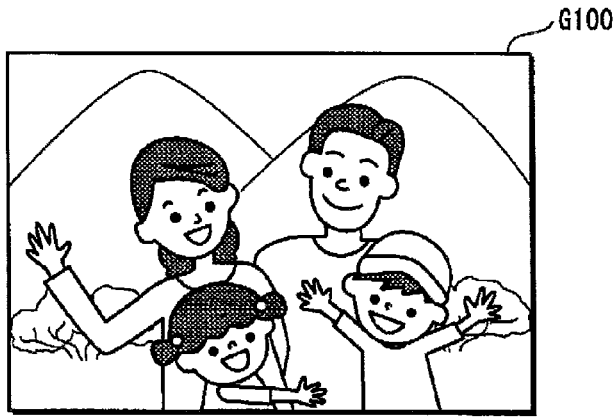
FIG. 3A shows an example of an image displayed on a display unit 106 before photography.

As shown in FIG. 3A, before photography the display unit 106 displays an image G100 including four subjects. At this point, the face detection unit 102 detects four faces, and the display unit 106 displays a frame surrounding each detected face.

Figure 3B:
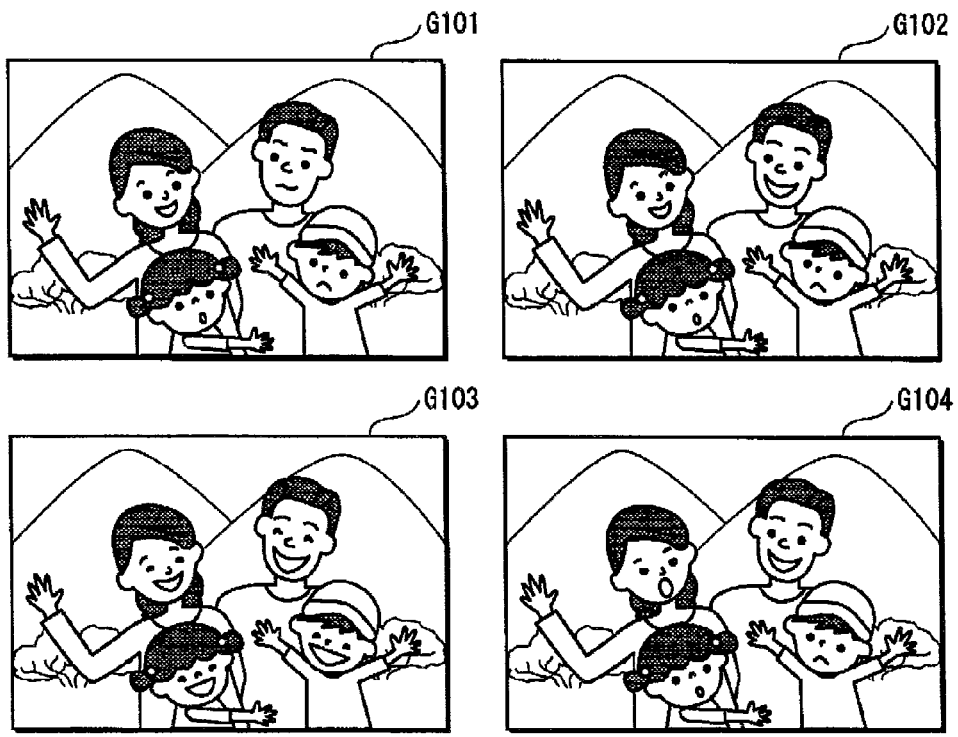
FIG. 3B shows an example of images captured during recommended photography.

FIG. 3B shows four images continuously captured during recommended photography. In this example, images are captured in the order G101, G102, G103, and G104. In the images G101 and G104, only one person is smiling. In the image G102, two people are smiling, and in the image G103, all of the subjects are smiling. When the images shown in FIG. 3B are captured, one image is specified as a recommended image via the functions of the smile detection unit 103, the evaluation unit 104, and the recommended image specification unit 105. In this example, the image G103 is specified as the recommended image.

Figure 4:
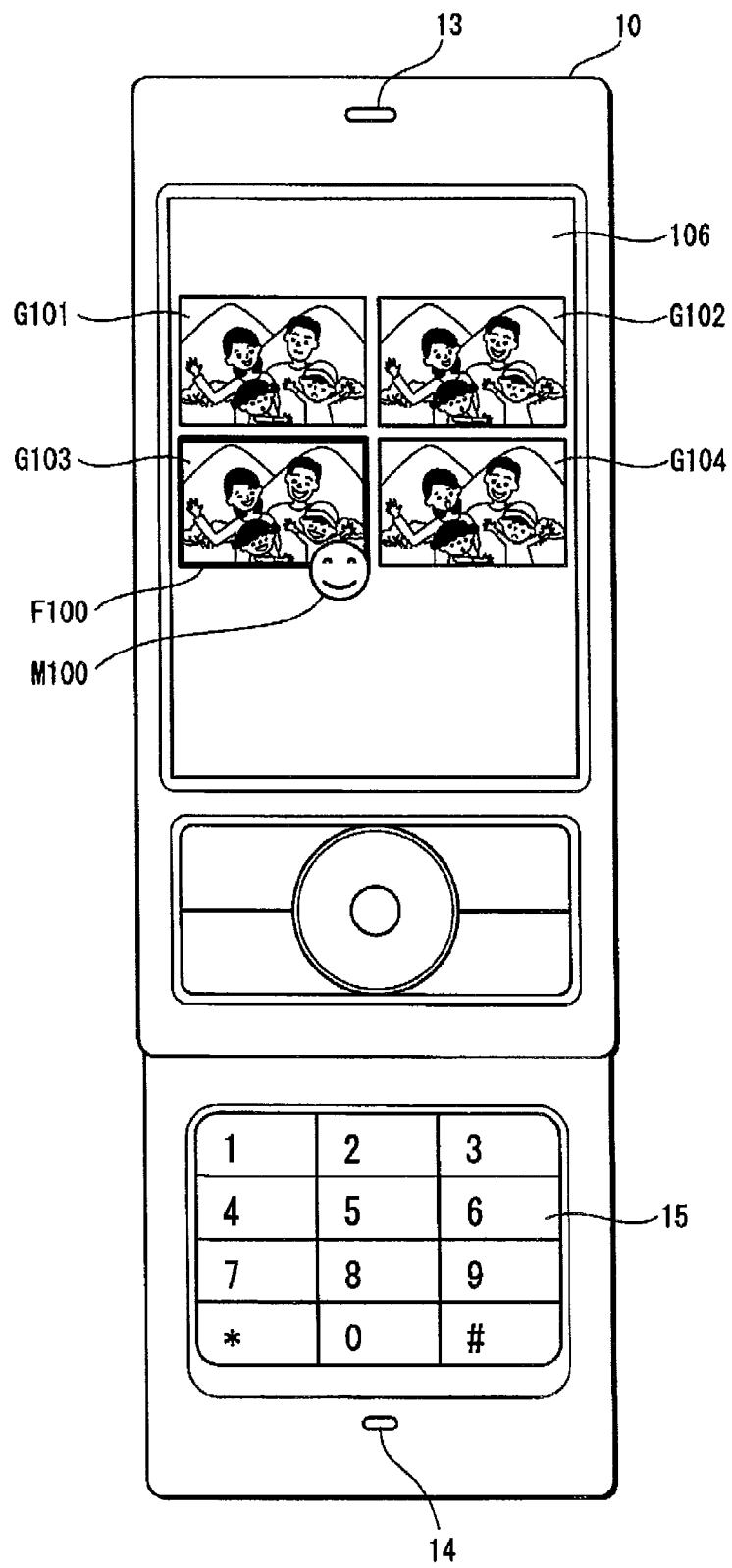
FIG. 4 shows an example of display of images captured during recommended photography.

As shown in FIG. 4, when displaying a list of the four images captured during recommended photography, the display unit 106 attaches a "recommendation mark" M100 to the image G103 so as to distinguish the image G103 from the images G101, G102, and G104. Also, the display unit 106 displays a frame F100 surrounding the image G103 to indicate that the image G103 is selected as a target of operation. Note that when the images G101-G104 are displayed in the list, the thumbnail for each image is displayed as described above.

(7) User Operation Unit 107

The user operation unit 107 includes key units 15, 16, and 17 and has the function of receiving instructions from the user. Specifically, the user operation unit 107 receives a photography instruction (pressing of the key unit 16) to begin recommended photography. Furthermore, when the four images captured during recommended photography are displayed as a list, the user operation unit 107 receives an instruction to change the image selected as the target of operation and an instruction to store the image selected as the target of operation (storage instruction).

(8) Image Storage Unit 108

The image storage unit 108 stores an image for which the user operation unit 107 receives a storage instruction (the image that is the target of operation upon receipt of the storage instruction).

1.3 Operations (1) Overall Operations

Figure 5:
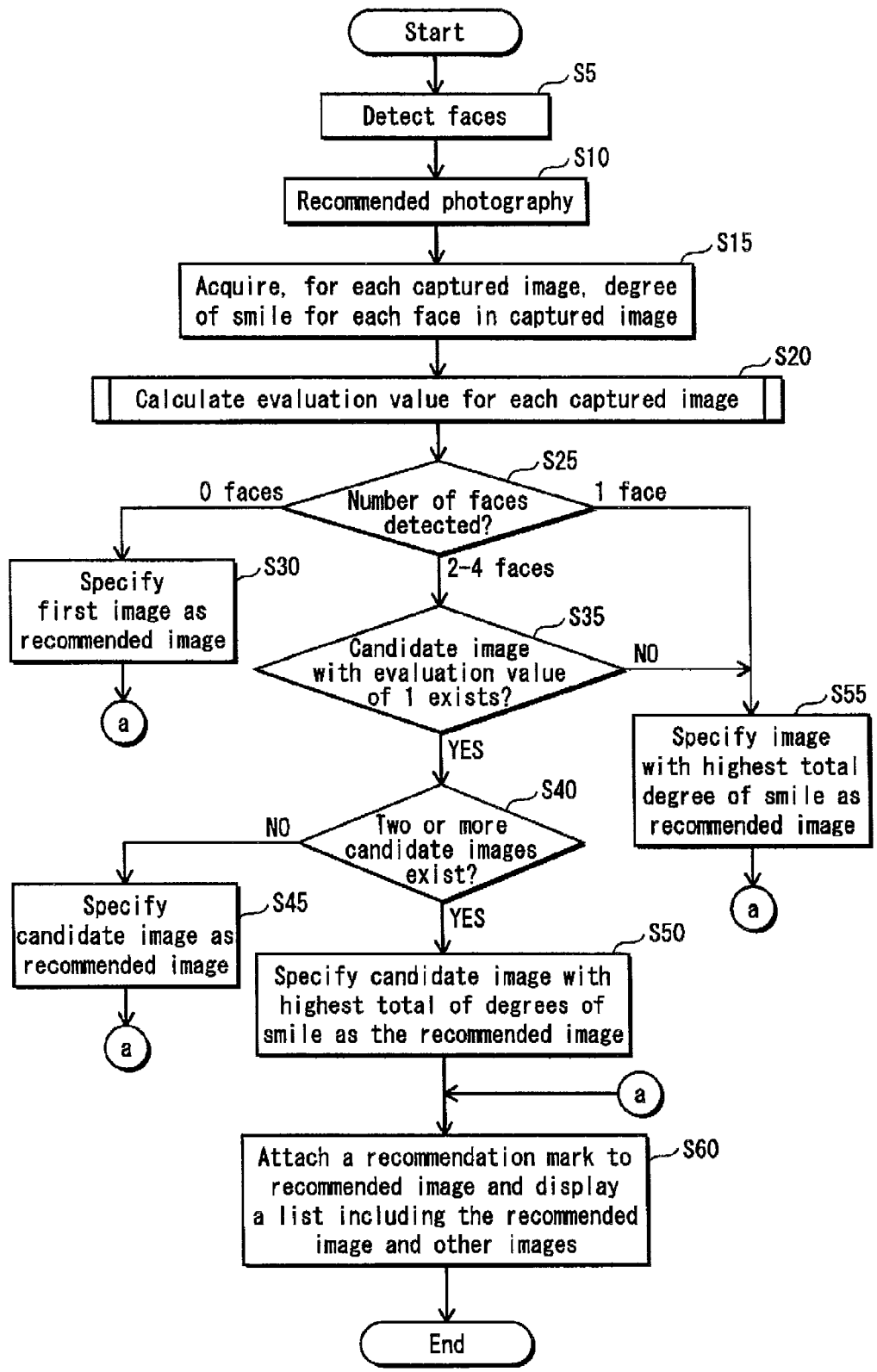
FIG. 5 is a flowchart showing operations related to recommended photography.

The following describes operations related to recommended photography with reference to the flowchart in FIG. 5.

The face detection unit 102 detects faces from among subjects captured by the camera lens 20 (step S5).

When the key unit 16 is pressed, the photography processing unit 101 performs recommended photography (step S10). Specifically, the photography processing unit 101 captures four images continuously at predetermined intervals.

The smile detection unit 103 acquires, for each of the four images captured during recommended photography, a degree of smile for each face detected in the image, in accordance with the results of face detection (step S15).

For each captured image, the evaluation unit 104 calculates an evaluation value using the degrees of smile acquired for the image (step S20). Specifically, the evaluation unit 104 calculates the ratio of smiles having a degree of smile of at least 45 to the number of faces detected by the face detection unit 102.

The recommended image specification unit 105 determines the number of faces detected by the face detection unit 102 (step S25).

When the number of faces detected is zero (step S25: zero), the recommended image specification unit 105 specifies the first image that was captured during recommended photography as the recommended image (step S30).

When between two and four faces are detected (step S25: two to four), the recommended image specification unit 105 determines whether a candidate image having an evaluation value of one exists among the images evaluated by the evaluation unit 104 (step S35).

When a candidate image is determined to exist (step S35: Yes), the recommended image specification unit 105 furthermore determines whether two or more candidate images exist (step S40). When two or more candidate images do not exist, i.e. when only one candidate image exists (step S40: No), the recommended image specification unit 105 specifies the candidate image as the recommended image (step S45). When two or more candidate images exist (step S40: Yes), the recommended image specification unit 105 specifies the candidate image with the highest total of the degrees of smile as the recommended image (step S50).

When the number of faces detected is one (step S25: one), and when no candidate image with an evaluation value of one exists (step S35: No), the recommended image specification unit 105 specifies the candidate image with the highest total degree of smile among the four images captured during recommended photography as the recommended image (step S55).

Once a recommended image is specified, the display unit 106 attaches a recommendation mark M100 to the recommended image and displays a list including the recommended image and other images (step S60). Note that the thumbnail for each image is displayed in the list.

(2) Calculation of Evaluation Value

Figure 6:
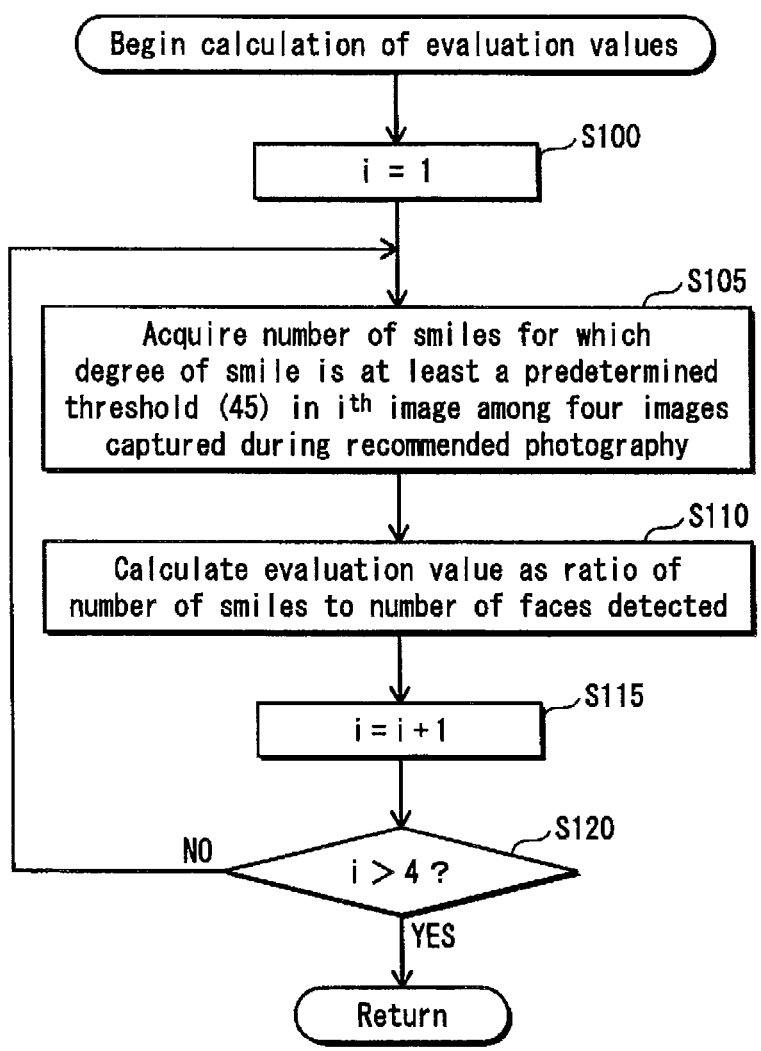
FIG. 6 is a flowchart showing operations for calculation of an evaluation value for each image captured during recommended photography.

The following describes calculation of the evaluation value in step S20 of FIG. 5 with reference to the flowchart in FIG. 6.

The evaluation unit 104 sets the value of a counter "i" to one (step S100).

The evaluation unit 104 acquires the number of smiles for which the degree of smile calculated in step S15 of FIG. 5 is at least a predetermined threshold (in this embodiment, 45) in the $i^{th}$ image among the images captured during recommended photography (step S105).

The evaluation unit 104 calculates the evaluation value as the ratio of the number of smiles having a degree of smile of at least 45 to the number of faces detected in step S5 of FIG. 5 (step S110).

The counter "i" is incremented by one (step S115).

The evaluation unit 104 then determines whether the value of the counter "i" is larger than four, which is the number of images captured during recommended photography (step S120).

If the value of the counter "i" is larger than four (step S120: Yes), processing terminates. If the value of the counter "i" is not larger than four, i.e. if the value is four or less (step S120: No), processing proceeds to step S105.

1.4 Advantageous Effects of Embodiment 1

For each image, the mobile phone 10 according to the above Embodiment calculates an evaluation value based on the number of subjects in the image that have a degree of smile of at least a predetermined value. Therefore, as the number of subjects with a degree of smile of at least the predetermined value increases, the evaluation value increases. As a result, the mobile phone 10 recommends an image in which many subjects are in a preferred condition.

1.5 Modifications

An embodiment of the present invention has been described, but the present invention is not limited to the above embodiment. For example, the following modifications are possible.

(1) In Embodiment 1, the smile detection unit 103 identifies the locations of faces included in each of the images captured during recommended photography based on the locations of the faces as detected before photography, but the present invention is not limited in this way. Faces may be detected in a captured image by facial detection processing in order to identify the positions of faces used in smile detection.

Such facial detection processing may use a different method than the method used in Embodiment 1. For example, characteristic points such as eyes or a nose may be extracted from a captured image in order to recognize a face.

(2) In Embodiment 1, the threshold of the degree of smile used when specifying a recommended image is 45, but the threshold is not limited in this way.

The threshold of the degree of smile used when specifying a recommended image may be a different value.

(3) In Embodiment 1, when a plurality of faces is detected, and no image with an evaluation value of one exists, the image with the highest total of the degrees of smile is specified as the recommended image, but the present invention is not limited in this way.

When no image with an evaluation value of one exists, the recommended image may be specified by placing a different condition on the evaluation value. For example, instead of a value of one, a reference value of 0.75 may be used for the evaluation value.

Alternatively, the reference value may be successively reduced until an image satisfying a certain condition is specified. For example, the reference value may be reduced successively as follows: 1, 0.75, 0.5, 0.25.

(4) In Embodiment 1, the number of images captured during recommended photography is four, but the number is not limited in this way.

The number of images captured during recommended photography may be any number two or greater.

(5) In Embodiment 1, a maximum of four faces are detected, but the maximum number is not limited in this way.

The maximum number of faces detected may be either less than or greater than four.

(6) In Embodiment 1, after recommended photography, thumbnails of the four images, including the recommended image, are displayed as a list, but the present invention is not limited in this way.

Only the recommended image may be displayed instead. In this case as well, the recommendation mark M100 is attached to the recommended image as in Embodiment 1.

Display may then be switched to other images by user operation.

Additionally, when only the recommended image is displayed, the user is able to recognize that the displayed image is the recommended image, and therefore the recommendation mark M100 may be omitted from the display.

(7) In Embodiment 1, after recommended photography, when thumbnails of the four images, including the recommended image, are displayed as a list, the image selected as the target of operation may be changed or written in the image storage unit 108 in response to user operation, but the present invention is not limited in this way.

Alternatively, only the recommended image may be displayed with the recommendation mark M100 attached thereto, and a message inquiring whether or not to save the image may also be displayed. A user instruction regarding whether or not to save the image may then be received.

Alternatively, when displaying the recommended image with the recommendation mark M100 attached thereto, the recommended image may be written to the image storage unit 108. In this case, it is possible to display only the recommended image, or to display a list including the recommended image and other images.

(8) In Embodiment 1, the mobile phone 10 is a sliding model, but the mobile phone 10 is not limited in this way. The mobile phone 10 may be folding, or may be a "straight" shape without moving or sliding parts. In other words, the shape of the mobile phone 10 is not limited, as long as the mobile phone 10 is provided with a camera function.

(9) In Embodiment 1, the degree of smile is used to specify the recommended image, but specification is not limited in this way.

Instead of the degree of smile, it is possible to use a degree of suitability regarding how suitable the shooting conditions of a subject are. In this case, an acquisition unit in the mobile phone acquires a degree of suitability by comparing sample images of characteristic locations indicating suitable conditions with the corresponding locations in a subject, using the degree of matching to acquire the degree of suitability.

(10) In Embodiment 1, a mobile phone is described as an example of a terminal device adopting the imaging device of the present invention, but the present invention is not limited in this way.

A terminal device adopting the imaging device of the present invention may be any other device such as a digital camera, a Personal Digital Assistant (PDA), a game machine, a Personal Handy-phone System (PHS), a personal computer, etc.

(11) The above Embodiments and Modifications may be combined with one another.

1.6 Supplementary Explanation (1) An imaging device according to an aspect of the present invention comprises: a photography unit configured to capture a plurality of images; an acquisition unit configured to identify a plurality of subjects in each of the captured images and to acquire a photographic degree of suitability for each identified subject; an evaluation unit configured to calculate an evaluation value for each captured image based on the number of subjects in the captured image having a photographic degree of suitability of at least a predetermined threshold; and a display unit configured to specify one of the captured images based on the evaluation value and display the specified one of the captured images so as to be distinguishable from the other captured images.

With the above structure, the imaging device recommends a preferred image to a user from among a plurality of images by (i) calculating the evaluation value for each captured image based on the number of subjects in the captured image having a photographic degree of suitability of at least the predetermined threshold, (ii) specifying one of the captured images based on the evaluation value, and (iii) displaying the specified one of the captured images so as to be distinguishable from the other captured images.

(2) Each of the subjects may be a face of a person, the photographic degree of suitability may evaluate a smile on the face, and the acquisition unit may identify a plurality of faces in each of the captured images and acquire the degree of suitability for each identified face.

The imaging device with the above structure recommends an image in which subjects are smiling by acquiring the degree of smile for each of the subjects in each of the captured images.

(3) The evaluation value may be a ratio of the number of faces having the degree of suitability of at least the predetermined threshold to the number of the identified faces, and the display unit may specify one of the captured images having a highest evaluation value.

Since a higher ratio indicates that more subjects are smiling, the imaging device with the above structure recommends an image in which many subjects are smiling by using the image with the highest ratio.

(4) When the captured images include a captured image having an evaluation value of one, the display unit may specify the captured image having an evaluation value of one.

The imaging device with the above structure recommends to the user an image in which all of the subjects have a degree of smile of at least the predetermined threshold by recommending a captured image whose evaluation value is one when such a captured image exists.

(5) When all the captured images have evaluation values less than one, instead of specifying one of the captured images based on the evaluation value, the display unit may specify one of the captured images having a highest total of degrees of smile.

When all the captured images have evaluation values less than one, the imaging device with the above structure displays the captured image having the highest total of degrees of smile so as to be distinguishable from the other captured images. Therefore, when not all of the subjects are smiling, the imaging device with the above structure recommends to the user the image with the highest total of degrees of smile.

(6) When two or more of the captured images have the highest evaluation value, the display unit may specify one of the two or more captured images having a highest total of degrees of smile.

With the above structure, when two or more captured images have the highest evaluation value, the imaging device recommends only one image to the user by using the total of degrees of smile.

(7) The display unit may display the captured image having the highest evaluation value with a mark attached thereto to indicate recommendation and display the captured image having the highest evaluation value in a list with the other captured images.

With the above structure, the imaging device attaches a mark to the captured image having the highest evaluation value to indicate recommendation and displays this captured image so as to be distinguishable from the other captured images in a list, thereby allowing the user to easily recognize which image is being recommended.

(8) The present invention may be a terminal device provided with the imaging device of any of (1) through (7) above.

With the above structure, the terminal device is provided with the imaging device of one of (1) through (7) above, thus allowing the terminal device to recommend a preferred image to a user from among a plurality of images.

INDUSTRIAL APPLICABILITY

The present invention is useful in a device that, when capturing a plurality of images, recommends one of the images to a user.

REFERENCE SIGNS LIST

10 mobile phone
11, 12 housing
13 speaker
14 microphone
15, 16, 17 key units
20 camera lens
101 photography processing unit (photography unit)
102 face detection unit
103 smile detection unit (acquisition unit)
104 evaluation unit
105 recommended image specification unit
106 display unit
107 user operation unit
108 image storage unit

The invention claimed is:

1. An imaging device comprising:
a photography unit configured to capture a plurality of images;
an acquisition unit configured to, for each of the plurality of images,
identify a plurality of faces in the image, and
calculate a degree-of-smile value for each of the identified plurality of faces;
an evaluation unit configured to, for each of the plurality of images, calculate an evaluation value for the image based on a ratio of a number of the identified plurality of faces in the image having a degree-of-smile value of at least a predetermined threshold to a total number of the identified plurality of faces in the image;
a recommendation unit configured to select a recommended image from the plurality of images by, when exactly one of the plurality of images has an evaluation value of at least a reference threshold, select the one image as the recommended image, and, when two or more of the plurality of images each have an evaluation value of at least the reference threshold, select one of the two or more images, for which the identified plurality of faces have a highest total degree-of-smile value, as the recommended image; and a display unit configured to simultaneously display the plurality of images, and display an object linked only to the recommended image such that the recommended image is distinguishable from the others of the plurality of images.

2. The imaging device of claim 1, wherein the reference threshold is a value of one.

3. The imaging device of claim 1, wherein the recommendation unit is further configured to, when none of the plurality of images have an evaluation value of at least the reference threshold, select one of the plurality of images, for which the identified plurality of faces have a highest total degree-of-smile value, as the recommended image.

4. The imaging device of claim 1, wherein the degree-of-smile value is an integer within a predetermined range, and wherein one end of the predetermined range represents a broad grin.

5. The imaging device of claim 1, wherein the object is a mark.

6. The imaging device of claim 1, wherein the object is a frame surrounding the recommended image.

7. The imaging device of claim 1, wherein the recommendation unit is further configured to reduce the reference threshold until at least one of the plurality of images has an evaluation value of at least the reference threshold.

8. A terminal device provided with the imaging device of claim 1.

9. An imaging method comprising:

capturing a plurality of images;

for each of the plurality of images, identifying a plurality of faces in the image, calculating a degree-of-smile value for each of the identified plurality of faces, and calculating an evaluation value for the image based on a ratio of a number of the identified plurality of faces in the image having a degree-of-smile value of at least a predetermined threshold to a total number of the identified plurality of faces in the image;

selecting a recommended image from the plurality of images by, when exactly one of the plurality of images has an evaluation value of at least a reference threshold, selecting the one image as the recommended image, and, when two or more of the plurality of images each have an evaluation value of at least the threshold value, selecting one of the two or more images, for which the identified plurality of faces have a highest total degree-of-smile value, as the recommended image; and displaying the recommended image so as to be distinguishable from the others of the plurality of images.

* * * * *